(12) United States Patent
Schröter et al.

(10) Patent No.: US 12,529,439 B2
(45) Date of Patent: Jan. 20, 2026

(54) FLUID CONNECTION UNIT

(71) Applicant: Fränkische Industrial Pipes GMBH & CO. KG, Königsberg (DE)

(72) Inventors: Dirk Schröter, Pfarrweisach (DE); Manfred Krauss, Hettstadt (DE); Sören Schröter, Hallstadt (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 0 days.

(21) Appl. No.: 18/037,192

(22) PCT Filed: Nov. 11, 2021

(86) PCT No.: PCT/EP2021/081355
§ 371 (c)(1),
(2) Date: May 16, 2023

(87) PCT Pub. No.: WO2022/101330
PCT Pub. Date: May 19, 2022

(65) Prior Publication Data
US 2024/0003474 A1    Jan. 4, 2024

(30) Foreign Application Priority Data

Nov. 16, 2020    (DE) .................... 10 2020 130 213.4

(51) Int. Cl.
*F16L 37/088* (2006.01)
(52) U.S. Cl.
CPC ....... *F16L 37/0887* (2019.08); *F16L 2201/60* (2013.01)
(58) Field of Classification Search
CPC ... F16L 2201/10; F16L 2201/60; F16L 37/05; F16L 33/03
See application file for complete search history.

(56) References Cited

U.S. PATENT DOCUMENTS 4,875,715 A * 10/1989 Dennany, Jr. ......... F16L 37/133
285/379
4,913,467 A * 4/1990 Washizu ............. F16L 37/0985
285/39

(Continued)

FOREIGN PATENT DOCUMENTS

DE    102004017450 A1    10/2005
DE    112018000972 T5    11/2019

(Continued)

OTHER PUBLICATIONS

German Application No. 102020130213.4, "German Search Report", Aug. 13, 2021, 5 pages.

(Continued)

*Primary Examiner* — Zachary T Dragicevich
*Assistant Examiner* — Alexander T Rufrano
(74) *Attorney, Agent, or Firm* — Kilpatrick Townsend & Stockton LLP

(57) ABSTRACT

A unit for connecting a fluid line to a port of a superordinate assembly, comprising a base body comprising a connection piece at one axial end for connection to the fluid line and a receiving portion at another axial end. The unit comprises an insert element comprising a resilient material and at least one radially outwardly projecting protrusion. The insert element defines, in its interior, an axial central connection opening and is separate from and connectable to the base body. The at least one protrusion projects into a corresponding aperture formed in an area of the receiving portion. Each protrusion comprises a blocking flank extending outwardly in a substantially radial direction and facing the axial end of the base body opposite the connection piece. The blocking flank is configured to abut against a respective blocking protrusion on the base body in a receiving portion engaged state of the insert element.

14 Claims, 6 Drawing Sheets

(56) References Cited

U.S. PATENT DOCUMENTS

| | | | | |
|---|---|---|---|---|
| 5,628,531 | A | * | 5/1997 | Rosenberg .......... F16L 37/0985 |
| | | | | 285/87 |
| 5,662,359 | A | * | 9/1997 | Kargula ............. F16L 37/0987 |
| | | | | 285/86 |
| 9,333,950 | B2 | * | 5/2016 | Opel ..................... F16L 37/086 |
| 11,262,006 | B2 | * | 3/2022 | Oba ..................... F16L 37/084 |
| 11,384,880 | B2 | * | 7/2022 | Hunt ..................... F16L 37/144 |
| 11,725,762 | B2 | * | 8/2023 | Waschkewitz ...... F16L 37/0885 |
| | | | | 285/321 |
| 11,774,024 | B2 | * | 10/2023 | Barthel .............. F16L 37/0885 |
| | | | | 285/93 |
| 12,072,051 | B2 | * | 8/2024 | Kuhlhoff ............ F16L 37/0982 |
| 12,129,950 | B2 | * | 10/2024 | Schindler ........... F16L 37/0985 |
| 2004/0080160 | A1 | | 4/2004 | Rief |
| 2016/0369922 | A1 | * | 12/2016 | Blake ................ A61M 39/1011 |
| 2020/0248846 | A1 | | 8/2020 | Oba et al. |
| 2022/0282817 | A1 | * | 9/2022 | Güttinger ............ F16L 37/144 |
| 2023/0135793 | A1 | * | 5/2023 | Kuhlhoff ............ F16L 37/0985 |
| | | | | 285/93 |

FOREIGN PATENT DOCUMENTS

| | | | |
|---|---|---|---|
| EP | 2505896 A2 * | 10/2012 | ............. F16L 33/03 |
| GB | 2032030 A | 4/1980 | |
| IT | MI20121068 A1 | 12/2013 | |
| WO | 2021185419 A1 | 9/2021 | |

OTHER PUBLICATIONS

International Application No. PCT/EP2021/081355, "International Search Report and Written Opinion", Feb. 21, 2022, 13 pages.
European Application No. 21815122.3, Office Action mailed Jul. 31, 2024, 5 pages.

* cited by examiner

FLUID CONNECTION UNIT

CROSS REFERENCE TO RELATED APPLICATION

This application is a U.S. national phase of International Patent Application No. PCT/EP2021/081355 filed on Nov. 11, 2021, which claims priority to German Patent Application No. 10 2020 130 213.4, filed in Germany on Nov. 16, 2020. The entire contents of both of these applications are hereby incorporated herein by reference.

TECHNICAL FIELD

The present invention relates to a fluid connection unit for connecting a fluid line to a fluid line port.

BACKGROUND

For example, in the engine compartment of vehicles, various components are connected to one another using rubber fluid lines. However, such rubber lines may have the disadvantage that they are not particularly resistant to external influences, such as mechanical loads. In order to prevent kinking of the rubber fluid lines, it is often also necessary to manufacture the fluid lines in accordance with their special predetermined purpose in an already preformed state, i.e. to form curvatures of the fluid line already during manufacture. However, this severely limits the possible applications of a particular rubber fluid line, and it is necessary to manufacture a fluid line adapted to each specific application in conjunction with an associated special tool.

SUMMARY

It is therefore the object of the present invention to provide a fluid connection unit for connecting a fluid line to a fluid line port, which also allows a corrugated pipe to be connected to an existing fluid line port.

In accordance with the present invention, this object is solved by a fluid connection unit for connecting a fluid line to a fluid line port of a superordinate assembly, which is not part of the invention, comprising
a base body which has a connection piece at an axial end for connection to the fluid line, and which has a receiving portion at the other axial end,
an insert element comprising a resilient material, having at least one radially outwardly projecting protrusion and defining in its interior an axial central connection opening, wherein the insert element is manufactured separately from the main body and is connectable to the main body in such a manner that the at least one protrusion projects into a respective corresponding aperture formed in the area of the receiving portion, and
wherein the at least one protrusion has a blocking flank which, together with the associated protrusion, extends outwardly in a substantially radial direction and faces the axial end of the base body opposite the connection piece, the blocking flank being designed to abut against a blocking protrusion designed on the base body in a receiving portion engaged condition of the insert element.

It should be noted at this point that the "one axial end" of the base body and the "other axial end" of the base body represent two free ends of the fluid connection unit, which do not necessarily have to be located on an axis.

A fluid line designed as a corrugated pipe can be connected to the connection piece of the base body, wherein the corrugated pipe does not have to consist exclusively of a sequence of corrugated troughs and corrugated crests, but can also comprise smooth portions, i.e. portions which have a substantially cylindrical shape over a predetermined area, and/or portions with increasing or decreasing diameter.

Advantageously, the insert element can have at least two, particularly at least four, radially outwardly projecting protrusions. A plurality of protrusions may have the advantage of having portions of the base body disposed between the respective protrusions, as viewed in a circumferential direction relative to an axis defined by the axial central connection opening, such that rotational retention of the insert element relative to the base body may be manufactured by engagement between the protrusions of the insert element and the base body.

The fluid connection unit according to the invention thus makes it possible to connect fluid lines which are designed, for example, as corrugated pipes made of plastic to existing components which are provided with a corresponding fluid line port which is set up for connecting a rubber fluid line. The use of corrugated pipes as fluid lines can make it possible to manufacture cost-effective corrugated pipes that are designed to be straight in their main direction of extension, and to provide the fluid lines with bends only when they are used in accordance with their intended purpose, i.e. to shape them into a desired course of the fluid line.

Due to the two-part design of the insert element and the base body, it is possible to optionally connect the same base body to different insert elements which differ, for example, in a design of the axial central connection opening (for example, different diameters), such that the fluid connection unit according to the invention can be set up for connection to differently designed fluid line ports. The fact that identically designed components of the fluid connection unit according to the invention can be used for different fluid line ports means that the manufacturing costs of the fluid connection unit according to the invention can be significantly reduced. Of course, it is also conceivable that different base bodies fit a particular insert element, such as base bodies that differ in the design and/or orientation of the connection piece, i.e. an angle formed between the connection piece and the rest of the base body.

In a further aspect of the present invention, the fluid connection unit may further comprise a clamping element adapted to engage the receiving portion and, in a condition engaged with the receiving portion, to exert a force on the least one protrusion in such a manner as to radially inwardly bias an inner wall defining the axial central connection opening of the insert element. The clamping element can be substantially annular and designed from an elastic material, particularly a spring steel. By using the clamping element, a connection of the fluid connection unit to the fluid line port can be strengthened in such a manner that this connection can withstand higher extraction forces, which are exerted, for example, due to a high fluid pressure of the fluid carried in the fluid line.

Here, too, it is possible for a base body or insert element to be connectable to different clamping elements which differ, for example, in their thickness and/or material (metal, plastic, etc.). In this manner, different clamping forces and holding forces can be achieved between the insert element and the fluid line port.

Here it is conceivable both that the at least one protrusion of the insert element projects radially outwardly in such a manner that it can come into contact with the clamping element, which is designed to be substantially smooth at least on the inside thereof, and that the clamping element has radially inwardly projecting protrusions which project radially inwardly in such a manner that they can contact the insert element in a state of the insert element being connected to the receiving portion.

In this regard, the base body may further have a further receiving portion adapted to be engaged by the clamping element in an initial position thereof. That is, the fluid connection unit according to the invention may have the clamping element connected to the further receiving portion in its as-delivered state. Once the fluid connection unit has been connected to the corresponding fluid line port, the clamping element can be easily relocated from the further receiving portion to the receiving portion for contact with the at least one protrusion of the insert element.

Advantageously, the fluid connection unit may further comprise a code portion containing a code, wherein the code is suitable for identifying a fluid connection unit, wherein the code portion comprises in particular a code unique to a respective fluid connection unit and is advantageously a machine readable code, in particular a DMC and/or an RFID element. Thus, for quality assurance purposes, each fluid connection unit can be recorded and their use documented.

In particular, it may be convenient here that the code portion is arranged in the area of the further receiving portion in such a manner that the code, in the state of the clamping element engaged with the further receiving portion, is superimposed by the clamping element radially on the outside. In this manner, the clamping element can prevent the code portion from being read out in the fluid connection unit's as-delivered state or in the fluid connection unit's state that is not yet fully connected to the fluid line port, which can prevent a fluid connection unit from being documented as being assembled even though the corresponding connection has not yet been manufactured correctly. In the case of an optically readable code portion, the clamping element can prevent readout by being designed from a non-transparent material, such as a metal. In the case of an electromagnetically readable code portion, the clamping element can prevent readout by being designed from a shielding material, such as a metal.

The code portion may be designed separately from the base body and may be connectable to the base body, particularly using an adhesive, printing, and/or form closure such as a latch. It should be noted that the "separate design" of the code portion is not limited to a design as a separate component, but, as mentioned above, can also be realized by printing a corresponding code on the fluid connection unit.

In order to prevent the clamping element from unintentionally disengaging from the further receiving portion and thereby releasing the code portion, for example, a retaining protrusion can be arranged between the receiving portion and the further receiving portion, which protrusion projects radially outward from the base body in such a manner that the clamping element is prevented from being displaced from engagement with the further receiving portion in the direction of engagement with the receiving portion without changing the diameter of the clamping element. In order to secure the clamping element also in the opposite direction, i.e. a direction away from the receiving portion, the base body may also here have at least one radially outwardly projecting portion, for example an increase in the outer diameter of the base body.

In particular, the blocking protrusion can be connected to the rest of the base body via webs, wherein a minimum radial extension of the webs is less than a minimum radial extension of the rest of the blocking protrusion. In other words, the radially inner sides of the webs define a smaller inner diameter than a radially inner surface of the blocking protrusion. For example, the blocking protrusion may be substantially annular in design, and the webs may extend from a radially inner surface of the annular blocking protrusion in an axial direction across the receiving portion toward the further receiving portion, particularly up to the retaining protrusion. In the case where the insert element is designed to be in contact on the outside thereof with the radially inner surfaces of the webs, in the state of the insert element connected to the base body, an arcuate gap may be formed between two adjacent webs as viewed in a circumferential direction of the fluid connection unit. If the fluid connection unit is now pushed onto a fluid line port, the elastic material of the insert element can escape into a respective arcuate gap. This makes it easier to slide on the fluid connection unit, particularly in the case where the fluid line port is not designed to be cylindrical throughout on the outside.

Further, an inner wall of the axial central connection opening of the insert element may have a plurality of recesses which are recessed radially outwardly from a nominal diameter of the axial central connection opening and which extend in an axial direction relative to the connection opening at least in portions along the inner wall of the axial central connection opening of the insert element. These recesses, which may also be referred to as grooves, may reduce a friction surface between the insert element and the fluid line port in such a manner as to facilitate sliding the fluid connection unit of the invention onto a respective fluid line port.

A respective web of the base body can be assigned to a respective recess of the connection opening of the insert element in such a manner that a web and a recess, viewed in a radial direction, are aligned to overlap one another. In this manner, a reduced wall thickness of the insert element, i.e. a respective recess, is arranged in the area of an inner side of the webs, such that a force required for a correct connection of the fluid connection unit according to the invention with a respective fluid line port can be further reduced.

The plurality of recesses may extend from the axial end of the insert element associated with the blocking protrusion of the base body along the inner wall of the axial central connection opening of the insert element to a maximum of a location which is still just overlapped in a radial direction by the at least one protrusion. In particular, the recesses of the inner wall of the insert element may end in such a manner that at least a portion of the at least one protrusion of the insert element, viewed in a radial direction, overlaps a portion of the inner wall of the insert element which is substantially cylindrically designed, that is, free of the recesses of the inner wall (grooves) over an entire circumferential revolution. This can ensure that the insert element, in cooperation with the clamping element where appropriate, can manufacture a sealing engagement with the fluid line port.

Advantageously, the inner wall of the axial central connection opening of the insert element can have a circumferential notch. This notch can, for example, be designed as a counter-shape to a so-called "olive". Such an "olive" is a circumferential protrusion designed in the area of a free end of a fluid line port on the outside thereof.

This notch may be spaced apart from the plurality of recesses. That is, the recesses of the inner wall of the insert element do not extend to the notch, allowing large-area contact of the notch with the corresponding portion of the fluid line port (for example, the "olive") to be manufactured.

Adjacent to the notch, particularly in an area between the notch and the end of the recesses, at least one sealing lip can be arranged, which projects circumferentially from the inner wall of the insert element in a radially inward direction, advantageously at an angle.

The fluid connection unit may further comprise a sleeve unit adapted to be disposed radially outwardly of the connection piece and to secure a connection of the connection piece to the fluid line. In this case, by reducing its diameter, for example by shrinking or pressing, the sleeve unit can reinforce and secure an engagement of the fluid line with the connection piece.

In an advantageous embodiment, the at least one protrusion of the insert element in the area of the receiving portion can project further radially outward than the base body. That is, the webs connecting the blocking protrusion to the rest of the base body project less radially outward here than the protrusions of the insert element when the receiving portion is viewed in its circumferential direction. Thus, as noted above, an inner surface of the clamping element may be substantially smoothly designed.

Further, pressure clips can be provided on the protrusions of the insert element, wherein in particular one pressure clip can be associated with each protrusion. Preferably, a pressure clip completely overlaps a protrusion radially on the outside in each case. A pressure clip may have a base portion extending in the axial direction of the insert element and along the circumferential direction of the insert element, and two side portions, wherein the side portions extend in the axial direction of the insert element and substantially radially inward. The pressure clips can thus be designed in a U-shape in particular. A respective side portion may engage in particular with an undercut of a protrusion, for example with substantially radially inwardly extending flanks of the protrusion. In this case, a pressure clip can at least partially or even completely enclose a respective protrusion. Alternatively or additionally, the pressure clips can be bonded to the protrusions.

For example, the pressure clips can be attached to the protrusions after the insert element has been installed on the base body and before a fluid connection is inserted into the insert element. By attaching the pressure clips, the outer diameter of the insert element of the fluid connection unit or the protrusions thereof can be increased in particular, allowing the clamping element to exert an increased contact pressure on the fluid connection inside the insert element. For this purpose, it may be advantageous for the pressure clips to be manufactured from a material that is more rigid in relation to the material of the insert element, for example polyamide 6 or polypropylene or metal. Further, the attachment of the stiffer pressure clips can prevent the clamping element from contacting the webs of the base body and transmitting force to them in the course of elastic deformation of the insert element. Thus, substantially all of the restoring force of the clamping element can be used as a contact force on the fluid port.

It is also conceivable, instead of using the pressure clips, to manufacture the insert element in a multi-component injection molding method in such a manner that a respective protrusion of the insert element in particular can have a portion of softer material and a portion of stiffer material. For example, a protrusion may comprise a stiffer material radially outward and a softer material radially inward.

BRIEF DESCRIPTION OF THE DRAWINGS

The present invention will be described in greater detail below on the basis of an embodiment, with reference to the accompanying drawings. In the drawings.

DETAILED DESCRIPTION

Figure 1:
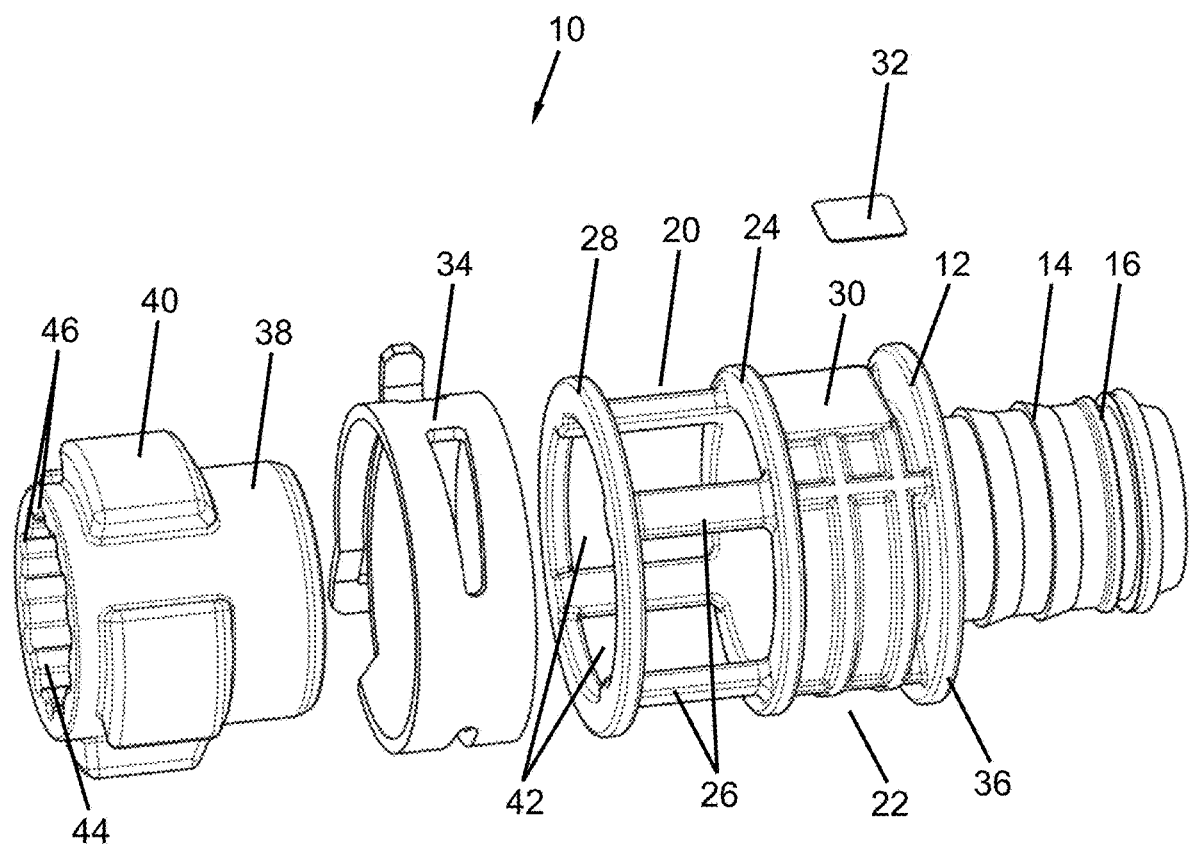
FIG. 1 shows an exploded view of a first embodiment of a fluid connection unit according to the invention.

In FIG. 1, a fluid connection unit according to the invention is generally designated by the reference numerals 10. The fluid connection unit 10 comprises a base body 12, which comprises a connection piece 14 at the end shown on the right in FIG. 1 for connecting the base body 12 to a fluid line (not shown in FIG. 1). A receiving notch 16 is arranged on the connection piece 14, which is designed to receive a sealing element 18 (see FIG. 2) for sealing against the fluid line.

The base body 12 comprises a receiving portion 20 and a further receiving portion 22, between which a retaining protrusion 24 is arranged, the radially outward extension of which is greater than that of the receiving portion 20 or the further receiving portion 22. In the receiving portion 20, in the embodiment shown here, four webs 26 are arranged connecting the retaining protrusion 24 to a blocking protrusion 28. It can be seen that the webs 26 are connected to the substantially annularly designed blocking protrusion 28 at a radially inner surface thereof, that is, projecting further radially inwardly than the blocking protrusion 28.

In the area of the further receiving portion 22, a receiving surface 30 is provided which is adapted to be connected to a code portion 32. A code is arranged on the code portion 32, which can be detected, for example, using an electronic reader.

In the illustrated embodiment, the fluid connection unit 10 further comprises a clamping element 34, which is designed here as an annular resilient clip. In an as-delivered state of the fluid connection unit 10 according to the invention, the clamping element 34 can be connected to the further receiving portion and held in place there by the retaining protrusion 24 and an increase in the outer diameter 36 of the base body 12. In this position, the clamping element 34 can cover/shield the code portion 32 in such a manner that it cannot be read out.

Furthermore, the fluid connection unit 10 according to the invention comprises an insert element 38, which is manufactured from an elastic material, for example rubber. The insert element 38 has protrusions 40 on the outer periphery thereof which project radially outwardly and which are dimensioned to engage in openings 42 designed in the receiving portion 20 of the base body 12 between respective adjacent webs 26.

The insert element 38 has an axial central connection opening 44 that is adapted to receive a fluid port. A plurality of recesses 46 are circumferentially distributed on an inner wall of the insert element 38 defining the axial central connection opening 44, which recesses 46 are recessed radially outwardly from a nominal diameter of the axial central connection opening 44 and which extend in a groove-like manner from the end of the insert element 38 shown on the left in FIG. 1 in an axial direction, that is, a direction substantially parallel to an axis X defined by the axial central connection opening 44 (see FIG. 3).

Figure 2:
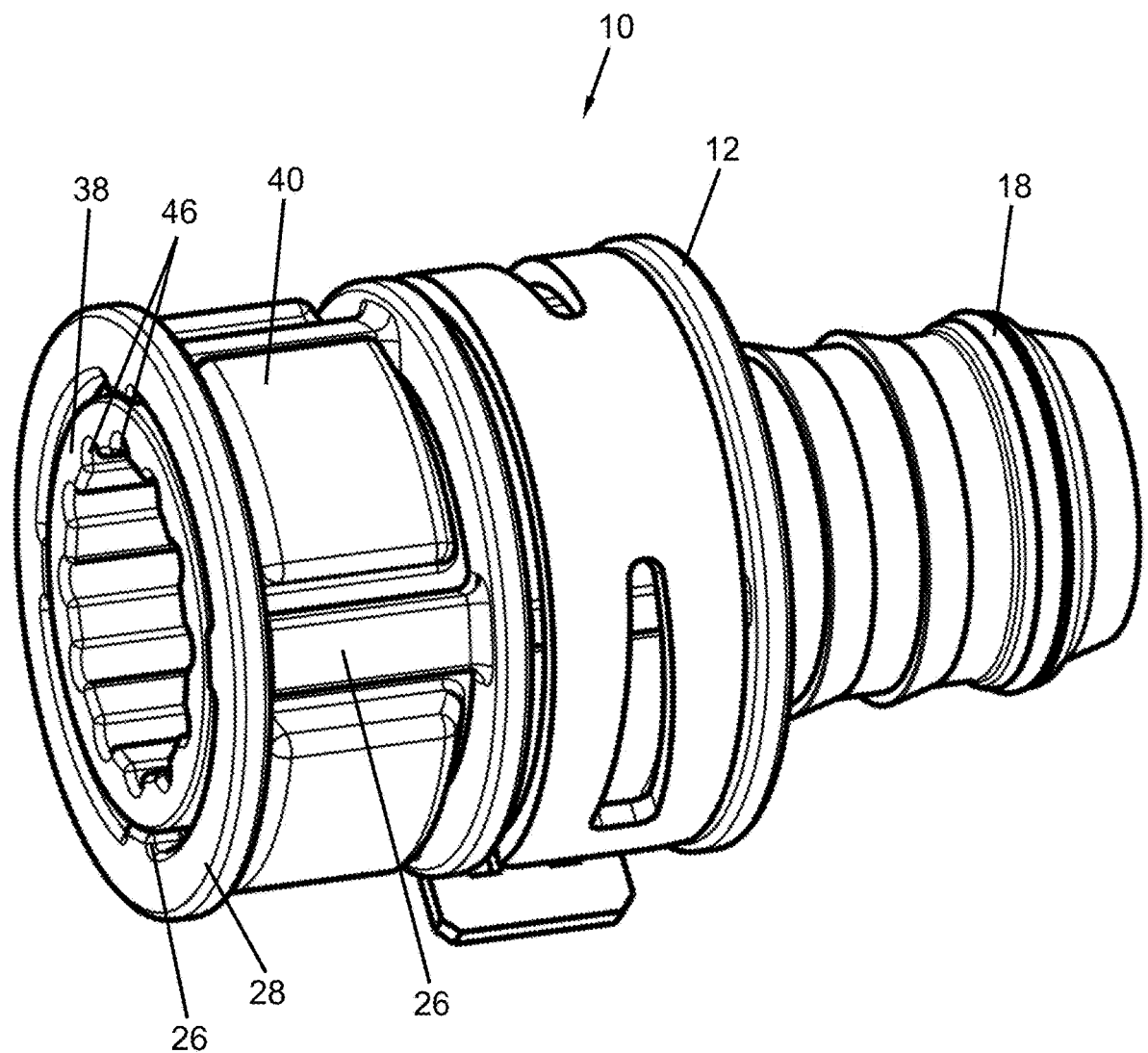
FIG. 2 shows a perspective view of the first embodiment of the fluid connection unit in accordance with FIG. 1 in an assembled state.

As can be seen in FIG. 2, the insert element 38 is rotationally secured and aligned relative to the base body 12 by the engagement of the protrusions 40 with the ridges 26 of the base body 12 such that a recess 46 is associated with a respective web 26 radially inwardly.

When the fluid connection unit 10 is pushed onto a corresponding fluid line port, the elastic material of the insert element 38, particularly when displaced over a so-called "olive" of the fluid line port, can escape into an arcuate free space which is left free on an inner side of the blocking protrusion 28 between two respective adjacent webs 26.

Figure 3:
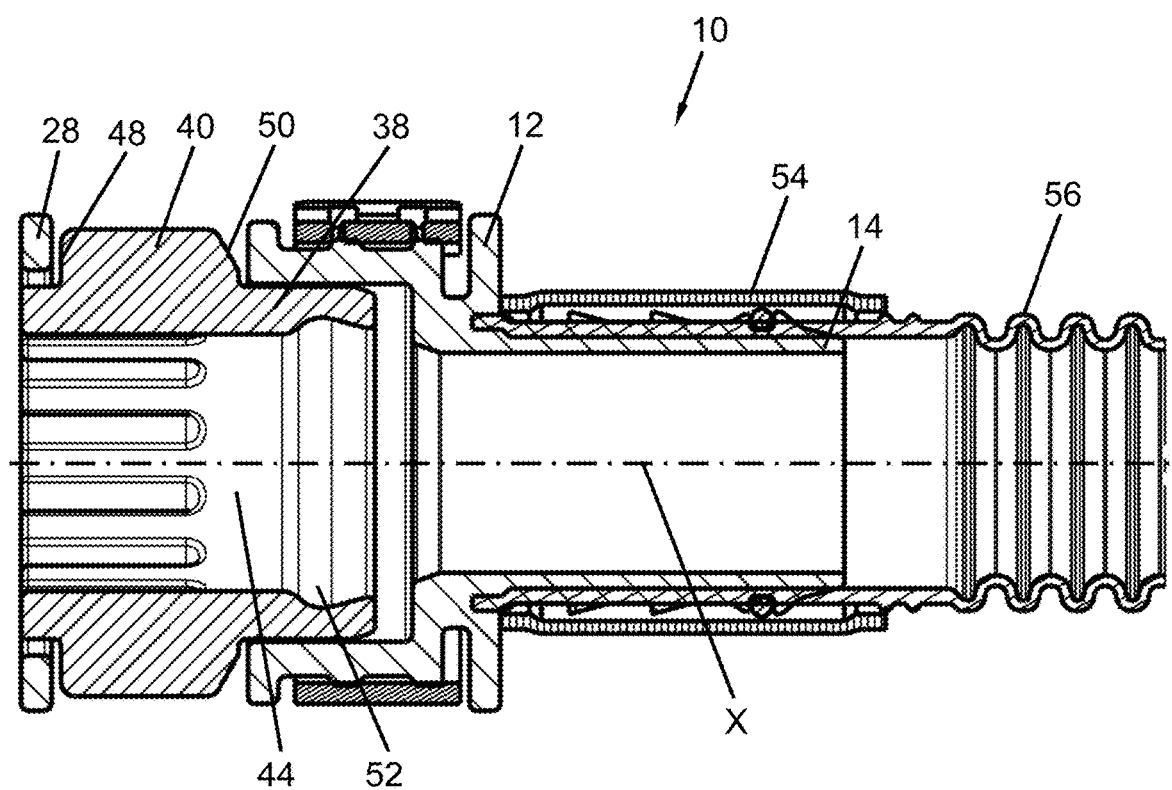
FIG. 3 shows a side cross-sectional view of the first embodiment of the fluid connection unit.

FIG. 3 further shows that the protrusions 40 of the insert element 38 have a blocking flank 48 on a side facing the blocking protrusion 28, which, particularly in the state of the fluid connection unit 10 connected to a respective fluid line port, prevent the insert element 38 from detaching from the base body 12 by contact with the blocking protrusion 28. On a side opposite the blocking protrusion 28, the protrusions 40 of the insert element 38 have insertion flanks 50 that facilitate connection of the insert element 38 to the base body 12.

It can also be seen in FIG. 3 that the groove-like recesses 46 still terminate in an area of the insert element 38 which is overlapped in a radial direction by the protrusions 40.

A notch 52 is further disposed on the inner wall of the axial central connection opening 44 of the insert element 38, which is adapted and designed to engage the "olive" of a fluid line port.

In the area of the connection piece 14 of the base body 12, a sleeve unit 54 is arranged radially outwardly, which can secure a connection of the connection piece 14 with the fluid line 56, for example by crimping.

Figure 4:
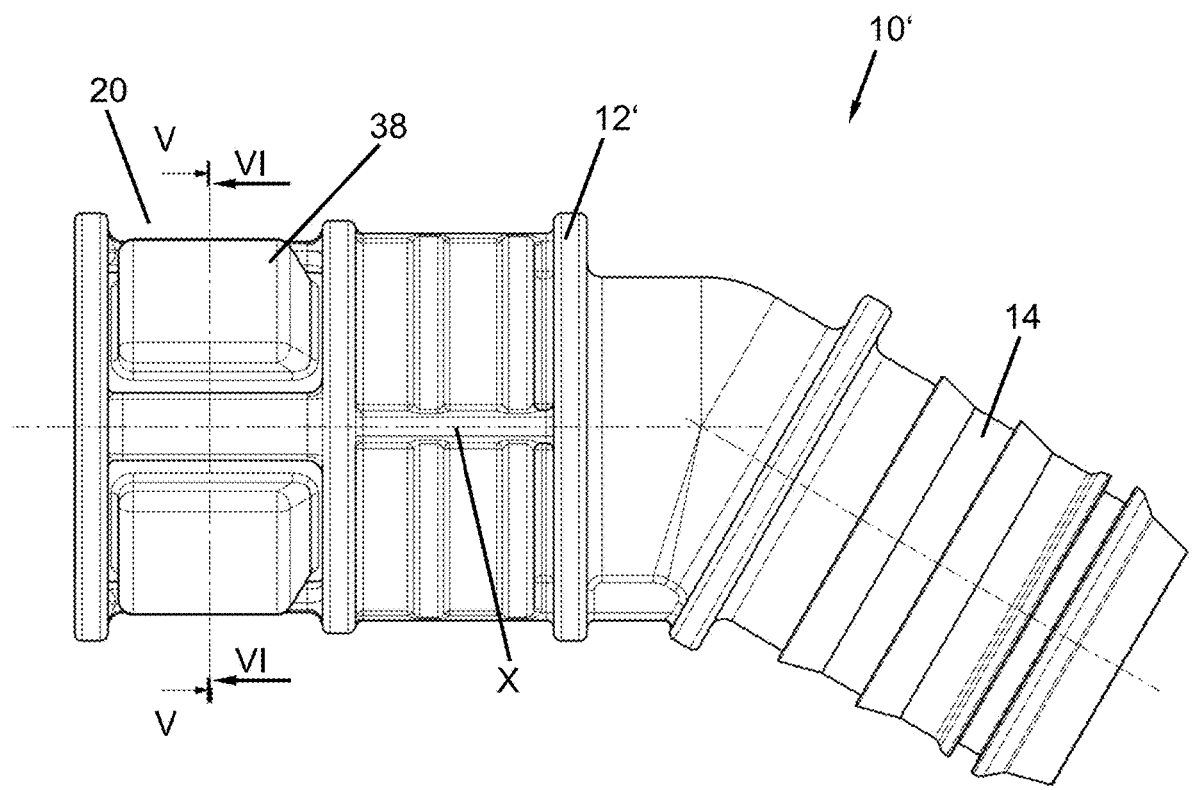
FIG. 4 shows a side view of a second embodiment of a fluid connection unit according to the invention.

FIG. 4 shows a second embodiment 10' of a fluid connection unit according to the invention, which differs from the first embodiment 10 only in that the connection piece 14 of the base body 12' is arranged on the latter to form an angle. Moreover, it should be explicitly noted that all features, effects and advantages of the first embodiment 10 may also be applicable to the second embodiment 10', and vice versa.

Figure 5:
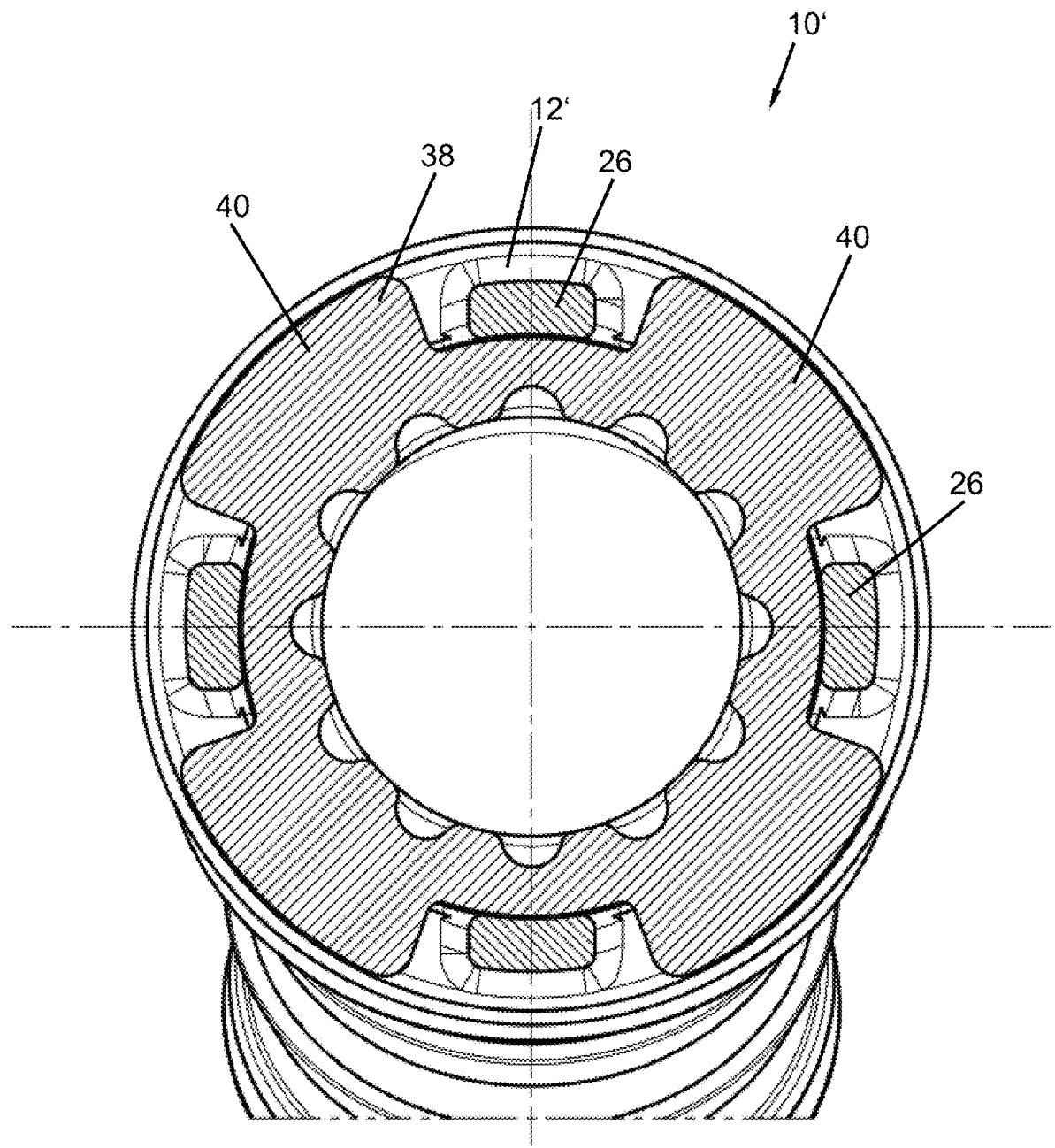
FIG. 5 shows a cross-sectional view of the second embodiment of the fluid connection unit according to the invention in accordance with the section line V-V of FIG. 4.

As indicated by the line V-V in FIG. 4, FIG. 5 shows a sectional view through the receiving portion 20 including the insert element 38 connected thereto. In FIG. 5, it can be clearly seen that the protrusions 40 of the insert element 38 project further radially outwards than a maximum radial extension of the webs 26 of the base body 12 or 12'.

When the clamping element 34 is connected to the receiving portion 20 after the fluid connection unit 10 or 10' has been fully connected to a respective fluid line port, the resilient restoring force of the clamping element 34 exerts a force on the protrusions 40 of the insert element 38 in such a manner that the resilient material of the insert element 38 is forced radially inward and pressed onto the fluid line port.

Figure 6:
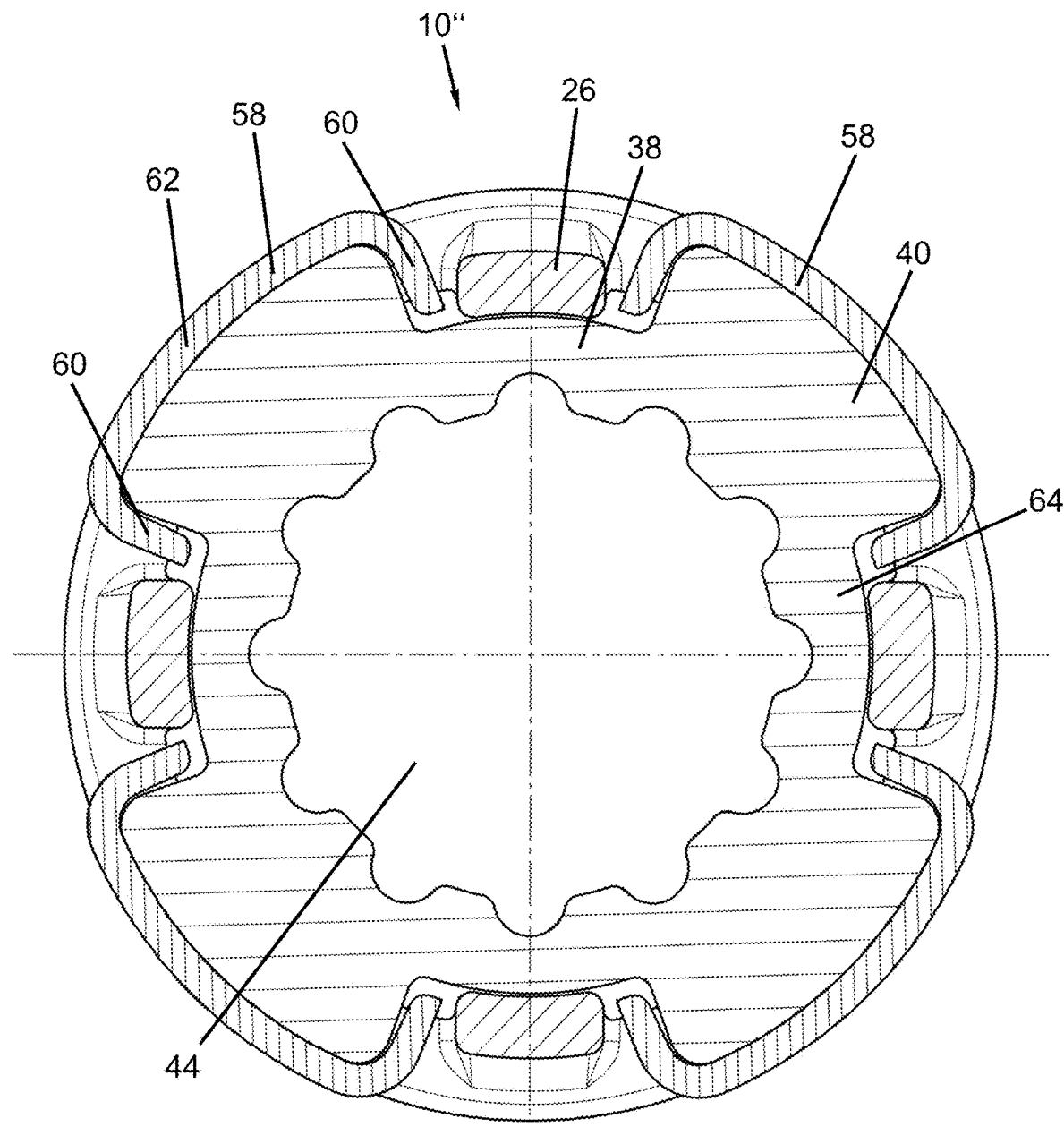
FIG. 6 shows a cross-sectional view of a third embodiment of a fluid connection unit according to the invention in accordance with section line VI-VI of FIG. 4.

Further, FIG. 6 illustrates a third embodiment 10" of a fluid connection unit according to the invention in a cross-sectional view. Analogous to the sectional view of the second embodiment 10' shown in FIG. 5, the cross-section shown in FIG. 6 extends along the same section line of FIG. 4. In FIG. 6, however, the viewing direction extends in the opposite direction to the viewing direction in FIG. 5, namely in the direction of the connection opening 44 of the insert element 38. The third embodiment 10" of the fluid connection unit according to the invention differs from the first embodiment 10 and the second embodiment 10' only in that pressure clips 58 are provided on the protrusions 40 of the insert element 38. In particular, a pressure clip 58 is associated here with each protrusion 40. Moreover, it should be explicitly noted that all features, effects and advantages of the first embodiment 10 and/or and the second embodiment 10' may also be applicable to the third embodiment 10", and vice versa.

A respective protrusion 40 is preferably completely overlapped radially outwardly by a pressure clip 58. Further, the pressure clips 58 each have two radially inwardly extending side portions 60 which are adapted to prevent release of the pressure clip 58 from a respective protrusion 40. Thereby, the pressure clips 58 can generate a clamping force in the state shown in FIG. 6, due to which the pressure clips 58 can be firmly held on the protrusions 40.

Alternatively or additionally, the pressure clips 58 can be bonded to the protrusions 40. The pressure clips 58 may be designed substantially U-shaped, wherein a respective base portion 62 of a pressure clip 58 extends in the circumferential direction and the two side portions 60 of a pressure clip 58, as legs of the U-shape, are arranged substantially at right angles to the base portion 62, in particular extending radially inwardly. The free ends of the two side portions 60 of a pressure clip 58 have a shorter distance from one another, particularly in the circumferential direction, than the maximum extension, viewed in the circumferential direction, of a respective protrusion 40.

By attaching the pressure clips 58, embodiment 10" of the fluid connection unit has an increased outer diameter in the area of the insert element 38 compared to embodiments 10 and 10'. The pressure clips 58 may in particular be manufactured from a plastic material that is more rigid with respect to the material of the insert element 38, preferably polyamide 6 or polypropylene. When the fluid connection unit 10" is now in a fluid port connected state, the resilient restoring force of the clamping element 34 (not shown in FIG. 6) exerts a force on the pressure clips 58, wherein this force is transmitted from the pressure clips 58 to the protrusions 40. Due to the increased outer diameter in the area of the insert element 38, the elastic material of the insert element 38 can be forced further radially inwards via the clamping element 34 and an increased contact pressure force can be generated on the fluid port.

Further, a distance between a respective free end of a side portion 60 to an intermediate portion 64 of the insert element 38 can be adjusted by designing the radial extension of the side portions 60 of a pressure clip 58. This makes it possible to define after which displacement of a pressure clip 58 in a radially inward direction the latter strikes against the intermediate region 64 of the insert element 38, i.e. comes into contact with the latter, wherein the restoring force of the clamping element 34 can then be transmitted to the insert element 38 both via the base portion 62 and via the side portions 60 of the pressure clip 58. Furthermore, the U-shaped arrangement of the pressure clips 58 can reduce the deformation of the elastic material of the insert element 38 in the circumferential direction. Overall, this can prevent the clamping element 34 from contacting the webs 26 in the course of elastic deformation of the insert element 38 and transmitting force to them instead of to the insert element 38.

Attachment of the pressure clips 58 to the protrusions 40 may be accomplished by bending the side portions 60, which may initially be less bent with respect to the base portion 62, to the state shown in FIG. 6 only after a respective pressure clip 58 contacts a protrusion 40, wherein a respective side portion 60 may be bent toward an undercut of a protrusion 40. Alternatively, the pressure clips 58 may be manufactured in a U-shaped state and then pressed onto the protrusions 40, wherein a higher elasticity of the material of the insert element 38 may be advantageous compared to the material of the pressure clips 58.

At this location, it should be mentioned that instead of subsequently attaching the pressure clips 58 to the protrusions 40, it is also conceivable to manufacture the insert element 38 using a multi-component injection molding method, wherein in particular a protrusion 40 can have a portion of softer material and a portion of stiffer material. For example, a respective protrusion 40 has a stiffer material radially outwardly and a softer material radially inwardly.

The invention claimed is:

1. A fluid connection unit for connecting a fluid line to a fluid line port of a superordinate assembly, comprising:
    a base body comprising:
        a connection piece at one axial end of the base body for connection to the fluid line;
        a receiving portion at another axial end of the base body having a blocking protrusion, wherein the blocking protrusion extends radially outwardly from the base body;
        a retaining protrusion that extends radially outwardly from the base body and is positioned between the connection piece and the receiving portion; and
        a further receiving portion between the retaining protrusion and the connection piece;
        wherein the blocking protrusion is connected to the retaining protrusion via webs, and wherein a minimum radial extension of the webs is less than a minimum radial extension of the remaining blocking protrusion such that radially inner sides of the webs define a smaller inner diameter than a radially inner surface of the blocking protrusion;
    an insert element comprising a resilient rubbery material and comprising a plurality of radially outwardly projecting protrusions, wherein the insert element defines, in an interior of the insert element, an axial central connection opening, wherein the insert element is separate from the base body and is connectable to the base body such that the plurality of radially outwardly projecting protrusions are dimensioned to engage in a respective corresponding openings formed in the receiving portion between respective adjacent webs and project radially outwardly beyond the webs;
    wherein each radially outwardly projecting protrusion comprises:
        a respective blocking flank that extends, together with the radially outwardly projecting protrusion, outwardly in a substantially radial direction and that faces the axial end of the base body opposite the connection piece;
        a respective insertion flank that extends, together with the radially outwardly projecting protrusion, outwardly in a substantially radial direction and that faces the base body in a direction of the connection piece; and
        wherein the respective blocking flank is configured to abut against the blocking protrusion and the respective insertion flank is configured to abut against the retaining protrusion when the insert element is inserted into the receiving portion; and
    a clamping element configured to engage the receiving portion and, in a state engaged with the receiving portion, to come into contact with and apply a force to the plurality of radially outwardly projecting protrusions to radially inwardly bias an inner wall defining the axial central connection opening of the insert element, wherein the further receiving portion is configured to be engaged by the clamping element in an initial position of the clamping element, and wherein the retaining protrusion projects radially outwardly from the base body such that the clamping element is prevented from being displaced from engagement with the further receiving portion toward engagement with the receiving portion without changing a diameter of the clamping element and in the initial position of the clamping element.

2. The fluid connection unit of claim 1, the fluid connection unit further comprising a code portion comprising a code, wherein the code is suitable for identifying a fluid connection unit.

3. The fluid connection unit of claim 1, further comprising a code portion comprising a code, wherein code portion is arranged in an area of the further receiving portion such that the code, in an engaged state of the clamping element with the further receiving portion, is superimposed radially outside by the clamping element.

4. The fluid connection unit of claim 2, wherein the code portion is separate from the base body and is connectable to the base body.

5. The fluid connection unit of claim 1, wherein an inner wall of the axial central connection opening of the insert element comprises a plurality of recesses recessed radially outwardly from a nominal diameter of the axial central connection opening, wherein the plurality of recesses extend in an axial direction relative to the connection opening at least in portions along the inner wall of the axial central connection opening of the insert element.

6. The fluid connection unit of claim 1, wherein a respective web of the base body is associated with a respective recess of the connection opening of the insert element such that the respective web and the respective recess, viewed in a radial direction, are aligned overlapping one another.

7. The fluid connection unit of claim 5, wherein the plurality of recesses extend from the axial end of the insert element associated with the blocking protrusion of the base body along the inner wall of the axial central connection opening of the insert element to a maximum of a location which is still just overlapped in a radial direction by the plurality of radially outwardly projecting protrusions.

8. The fluid connection unit of claim 5, wherein the inner wall of the axial central connection opening of the insert element comprises a circumferential notch.

9. The fluid connection unit of claim 8, wherein the notch is spaced apart from the plurality of recesses.

10. The fluid connection unit of claim 1, further comprising a sleeve unit configured to be disposed radially outwardly of the connection piece and to secure a connection of the connection piece to the fluid line.

11. The fluid connection unit of claim 1, wherein each of the protrusions of the insert element, in an area of the receiving portion, projects radially outward further than the base body.

12. The fluid connection unit of claim 2, wherein the code comprises a code unique to a respective fluid connection unit.

13. The fluid connection unit of claim 2, wherein the code comprises a machine readable code comprising one or more of a data matrix code ("DMC") or a radio frequency identification ("RFID") element.

14. The fluid connection unit of claim 4, wherein the code portion is connectable to the base body using one or more of an adhesive, a printing, or a form closure.

* * * * *